(12) United States Patent
Kunigk et al.

(10) Patent No.: US 8,467,526 B2
(45) Date of Patent: Jun. 18, 2013

(54) KEY EVOLUTION METHOD AND SYSTEM OF BLOCK CIPHERING

(75) Inventors: Jan Kunigk, Boeblingen (DE); Sinja Kunigk, Boeblingen (DE); Sven Lukas, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 12/135,576

(22) Filed: Jun. 9, 2008

(65) Prior Publication Data

US 2009/0304180 A1 Dec. 10, 2009

(51) Int. Cl.
| | |
|---|---|
| H04K 1/00 | (2006.01) |
| H04K 1/06 | (2006.01) |
| H04L 9/00 | (2006.01) |
| H04L 9/28 | (2006.01) |

(52) U.S. Cl.
USPC ............................................. 380/37; 380/28

(58) Field of Classification Search
USPC ..................................................... 380/28, 37
See application file for complete search history.

(56) References Cited

U.S. PATENT DOCUMENTS

| | | | |
|---|---|---|---|
| 7,200,227 B2 | 4/2007 | Rogaway | |
| 7,831,039 B2 * | 11/2010 | Bertoni et al. | 380/28 |
| 2003/0108196 A1 * | 6/2003 | Kirichenko | 380/37 |
| 2006/0182274 A1 * | 8/2006 | Nicolai et al. | 380/28 |
| 2006/0285684 A1 * | 12/2006 | Rogaway | 380/37 |
| 2009/0185677 A1 * | 7/2009 | Bugbee | 380/28 |

FOREIGN PATENT DOCUMENTS

WO 03/052630 A2 6/2003

OTHER PUBLICATIONS

Charanjit Jutla, "Encryption Modes with Almost Free Message Integrity", Lecture Notes in Computer Science, Proceedings of the International Conference on the Theory and Application of Cryptographic Techniques: Advances in Cryptology, vol. 2045, Published 2001, pp. 529-544, ISBN: 3-540-42070-3.

* cited by examiner

*Primary Examiner* — Kambiz Zand
*Assistant Examiner* — Benjamin Kaplan
(74) *Attorney, Agent, or Firm* — Schmeiser, Olsen & Watts

(57) ABSTRACT

A system and associated method for block ciphering. The method generates a key that is specific to a text block being encrypted and later being decrypted. The text block is encrypted by a block cipher encryption with the key. The encrypted text block is decrypted by a block cipher decryption with the key back to the text block. Altering a single bit in either the encrypted text block or the key results in unsuccessful decryption such that a decrypted text block is completely different from the before encryption.

20 Claims, 9 Drawing Sheets

N-TH CIPHERTEXT BLOCK $c_n = E_{(k \oplus n)}(p_n)$

FIG. 1A (PRIOR ART)

N-TH PLAINTEXT BLOCK $p_n = E_k(n) \oplus c_n$

EXAMPLE RESULT OF ALTERATION ON CIPHERTEXT ENCRYPTED
BY PRIOR ART

```
E01: Plain text: Please transfer 100,000 $ to my account.
     HEX DUMP:
E11: 0x50 0x6c 0x65 0x61 0x73 0x65 0x20 0x74
E12: 0x72 0x61 0x6e 0x73 0x66 0x65 0x72 0x20
E13: 0x31 0x30 0x30 0x2c 0x30 0x30 0x30 0x20
E14: 0x24 0x20 0x74 0x6f 0x20 0x6d 0x79 0x20
E15: 0x61 0x63 0x63 0x6f 0x75 0x6e 0x74 0x2e Encrypted text (1):
     HEX DUMP:
E21: 0x36 0x85 0x2e 0xb5 0x9c 0xef 0x0c 0x4f
E22: 0xfa 0x2d 0x94 0x2a 0xac 0x51 0x59 0x0e
E23: 0x57 0xd9 0x7b 0xf8 0xdf 0xba 0x1c 0x1b
E24: 0xac 0x6c 0x8e 0x36 0xea 0x59 0x52 0x0e
E25: 0x07 0x8a 0x28 0xbb 0x9a 0xe4 0x58 0x15

Encrypted text (2): altered bit 133
     HEX DUMP:
E31: 0x36 0x85 0x2e 0xb5 0x9c 0xef 0x0c 0x4f
E32: 0xfa 0x2d 0x94 0x2a 0xac 0x51 0x59 0x0e
E33: 0x5f 0xd9 0x7b 0xf8 0xdf 0xba 0x1c 0x1b
E34: 0xac 0x6c 0x8e 0x36 0xea 0x59 0x52 0x0e
E35: 0x07 0x8a 0x28 0xbb 0x9a 0xe4 0x58 0x15

E41: Decrypted text: Please transfer 900,000 $ to my account.
     HEX DUMP:
E51: 0x50 0x6c 0x65 0x61 0x73 0x65 0x20 0x74
E52: 0x72 0x61 0x6e 0x73 0x66 0x65 0x72 0x20
E53: 0x39 0x30 0x30 0x2c 0x30 0x30 0x30 0x20
E54: 0x24 0x20 0x74 0x6f 0x20 0x6d 0x79 0x20
E55: 0x61 0x63 0x63 0x6f 0x75 0x6e 0x74 0x2e
```

FIG. 5A

EXAMPLE RESULT OF ALTERATION ON CIPHERTEXT ENCRYPTED
WITH KEY EVOLUTION METHOD OF THE PRESENT INVENTION

```
E101  Plain text: Please transfer 100,000 $ to my account.
      HEX DUMP:
E111  0x50 0x6c 0x65 0x61 0x73 0x65 0x20 0x74
E112  0x72 0x61 0x6e 0x73 0x66 0x65 0x72 0x20
E113  0x31 0x30 0x30 0x2c 0x30 0x30 0x30 0x20
E114  0x24 0x20 0x74 0x6f 0x20 0x6d 0x79 0x20
E115  0x61 0x63 0x63 0x6f 0x75 0x6e 0x74 0x2e Encrypted text (1):
      HEX DUMP:
E121  0xe3 0x4e 0x13 0xeb 0x1c 0xb5 0x6b 0x4f
E122  0xf1 0xa4 0x8d 0x66 0xaf 0xf8 0xf6 0xd8
E123  0xed 0x29 0xb7 0x2f 0x74 0x51 0x59 0x5c
E124  0x45 0xef 0x51 0x87 0xbd 0x29 0x9b 0x71
E125  0x8d 0x3f 0xf1 0x58 0xc2 0xe4 0x0f 0x38
E126  0x9d 0x29 0xf0 0x7a 0xe9 0xd3 0xa5 0xd6

Encrypted text (2): altered bit 133
      HEX DUMP:
E131  0xe3 0x4e 0x13 0xeb 0x1c 0xb5 0x6b 0x4f
E132  0xf1 0xa4 0x8d 0x66 0xaf 0xf8 0xf6 0xd8
E133  0xe5 0x29 0xb7 0x2f 0x74 0x51 0x59 0x5c
E134  0x45 0xef 0x51 0x87 0xbd 0x29 0x9b 0x71
E135  0x8d 0x3f 0xf1 0x58 0xc2 0xe4 0x0f 0x38
E136  0x9d 0x29 0xf0 0x7a 0xe9 0xd3 0xa5 0xd6

E141  Decrypted text: Please transfer ?)?Y=Ra?Z??_? account.
      HEX DUMP:
E151  0x50 0x6c 0x65 0x61 0x73 0x65 0x20 0x74
E152  0x72 0x61 0x6e 0x73 0x66 0x65 0x72 0x20
E153  0xd0 0x29 0x81 0x59 0x07 0x3d 0x52 0xc9
E154  0x9a 0xf6 0x5a 0xd8 0xc3 0x5f 0xa9 0x05
E155  0x61 0x63 0x63 0x6f 0x75 0x6e 0x74 0x2e
E156  0x00 0x00 0x00 0x00 0x00 0x00 0x00 0x00
```

KEY EVOLUTION METHOD AND SYSTEM OF BLOCK CIPHERING

FIELD OF THE INVENTION

The present invention discloses a system and associated method for a block ciphering method that provides better message integrity than conventional block ciphering methods.

BACKGROUND OF THE INVENTION

Conventional block ciphering methods are devised to secure messages against a dictionary attack. A conventional block ciphering method that is configured to randomly access blocks during encryption is limited in providing message integrity because an encrypted text preserves same bit position as a text before encryption and after decryption.

Thus, there is a need for a system and associated method that overcomes at least one of the preceding disadvantages of current methods and systems of block ciphering methods.

SUMMARY OF THE INVENTION

The present invention provides a method for transforming a text in a first form to a corresponding text in a second form, the method comprising:

selecting a block from the text in the first form that comprises at least one block;

subsequent to said selecting, generating a key that is specific to the block;

subsequent to said generating, producing a corresponding block in the second form from the block with the generated key; and subsequent to said producing, communicating the produced block to an output device, wherein the selected block of said at least one block in the first form is transformed into a respective produced block in the second form, wherein said selecting, said generating, said producing, and said communicating are performed by a transformer.

The present invention provides a computer program product, comprising a computer usable storage medium having a computer readable program code embodied therein, said computer readable program code containing instructions that when executed by a processor of a computer system implement a method for transforming a text in a first form to a corresponding text in a second form, the method comprising:

selecting a block from the text in the first form that comprises at least one block;

subsequent to said selecting, generating a key that is specific to the block;

subsequent to said generating, producing a corresponding block in the second form from the block with the generated key; and subsequent to said producing, communicating the produced block to an output device, wherein the selected block of said at least one block in the first form is transformed into a respective produced block in the second form, wherein said selecting, said generating, said producing, and said communicating are performed by a transformer.

The present invention provides a computer system comprising a processor and a computer readable memory unit coupled to the processor, said memory unit containing instructions that when executed by the processor implement a method for transforming a text in a first form to a corresponding text in a second form, the method comprising:

selecting a block from the text in the first form that comprises at least one block;

subsequent to said selecting, generating a key that is specific to the block;

subsequent to said generating, producing a corresponding block in the second form from the block with the generated key; and subsequent to said producing, communicating the produced block to an output device, wherein the selected block of said at least one block in the first form is transformed into a respective produced block in the second form, wherein said selecting, said generating, said producing, and said communicating are performed by a transformer.

The present invention provides a method and system that overcomes at least one of the current disadvantages of conventional method and system for block ciphering.

DETAILED DESCRIPTION OF THE INVENTION

Figure 1A:
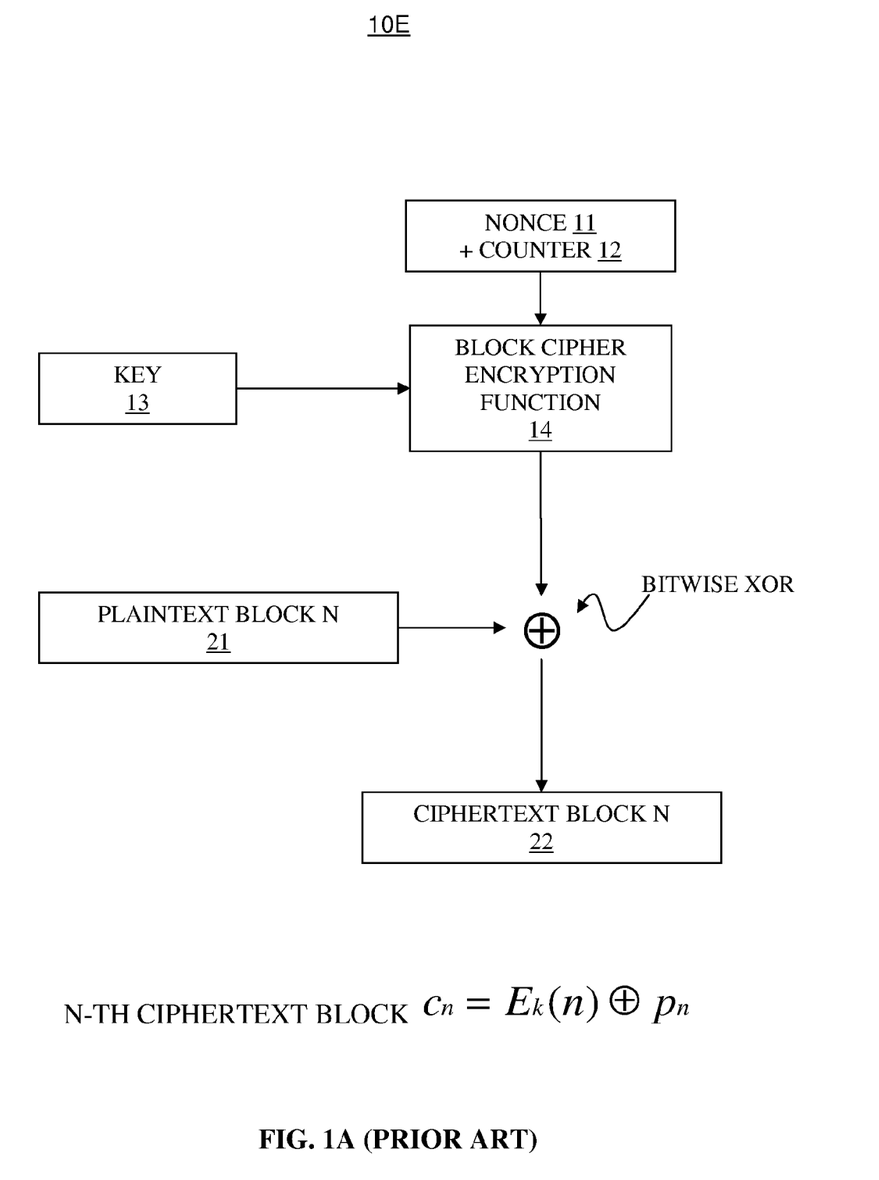
FIG. 1A illustrates a conventional block ciphering system for encrypting a block of a plaintext.

FIG. 1A illustrates a conventional block ciphering system 10E for encrypting a block of a plaintext. The system 10E comprises a nonce 11, a counter 12, a key 13, a block cipher encryption function 14, plaintext block N 21, and a ciphertext block N 22.

The block cipher encryption function 14 is one type of symmetric-key encryption algorithms that use a trivially related or an identical key in both encryption and decryption. The block cipher encryption function 14 may be, inter alia, the Advanced Encryption Standard (AES, or Rijndael) algorithm approved by the National Institute of Standards and Technology (NIST), etc.

The block cipher encryption function 14 encrypts the key 13 with a sum of the nonce 11 and the counter 12 and outputs an encrypted key.

The nonce 11 is a random number that is supposedly used only once in encrypting multiple plaintexts for security of data presently being encrypted.

The counter 12 is a unique number for the plaintext block N 21 that is used to ensure security of data presently being encrypted. The counter N 12 may be, inter alia, a sequence number of the block selected for encryption, etc.

The key 13 is used in both encryption and the decryption. The key size may be, inter alia, 128-bit, 192-bit, 256-bit, etc.

Throughout this specification, the term plaintext refers to a readable text that is not encrypted, and the term ciphertext refers to a text that is encrypted and ordinarily unreadable. The plaintext block N 21 is exclusively disjoined (XOR) with the encrypted key as a bit stream to encrypt the plaintext block N 21. Thus, a bit of the plaintext block N 21 is encrypted into a bit of the ciphertext block N 22 in the same bit position by exclusively disjoining the bit of the plaintext block N 21 and a bit of the encrypted key in the same bit position.

Figure 1B:
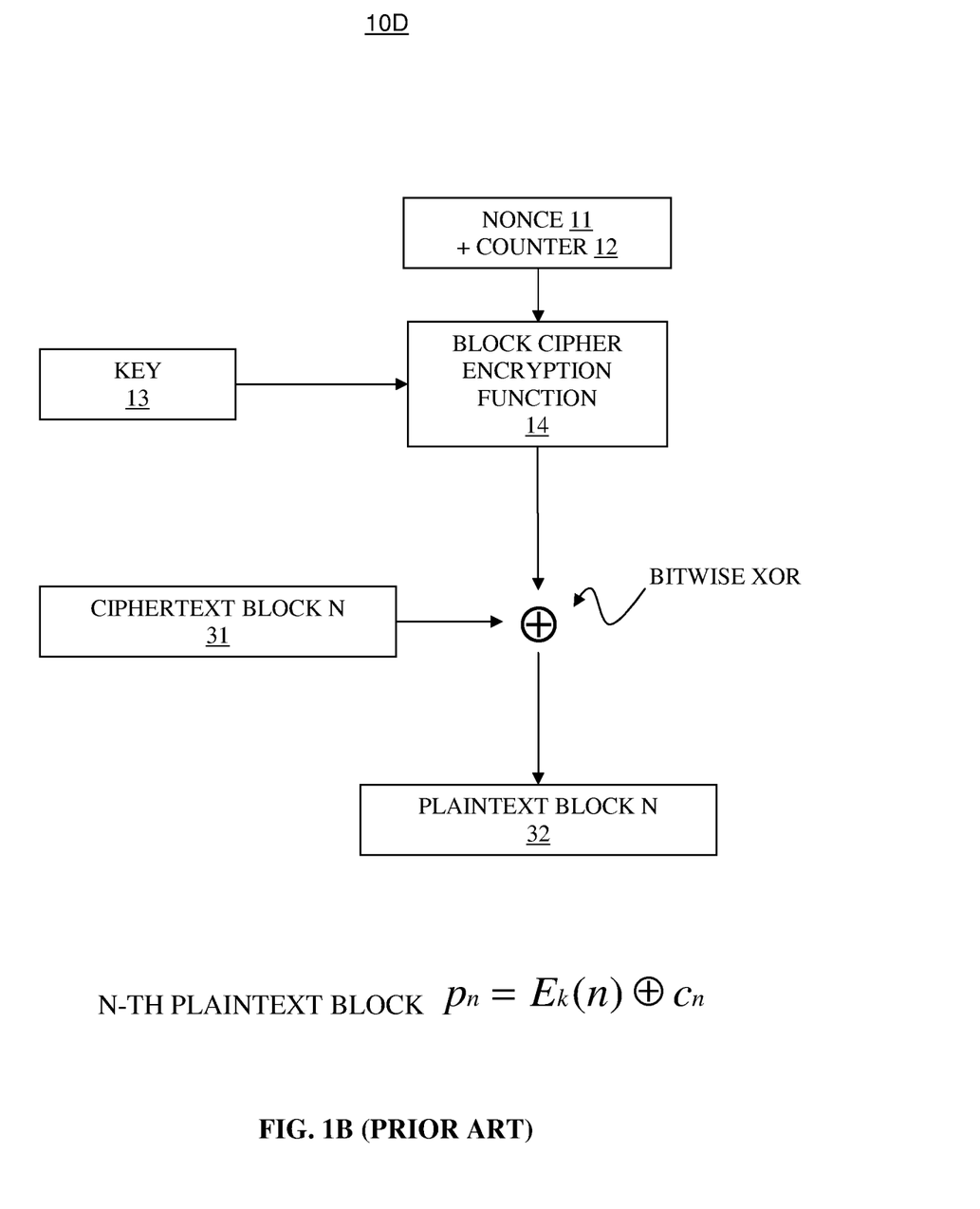
FIG. 1B illustrates a conventional block ciphering system for decrypting a block of a ciphertext.

FIG. 1B illustrates a conventional block ciphering system 10E for decrypting a block of a ciphertext. The system 10D comprises a nonce 11, a counter 12, a key 13, a block cipher encryption function 14, ciphertext block N 31, and a plaintext block N 32.

See descriptions in FIG. 1A, suro, for details of the nonce 11, the counter 12, the key 13, and the block cipher encryption function 14.

The ciphertext block N 31 is exclusively disjoined (XOR) with the encrypted key as a bit stream to decrypt the ciphertext block N 31. Thus, a bit of the ciphertext block N 31 is decrypted into a bit of the plaintext block N 32 in the same bit position by exclusively disjoining the bit of the ciphertext block N 31 and a bit of the encrypted key in the same bit position.

Figure 2A:
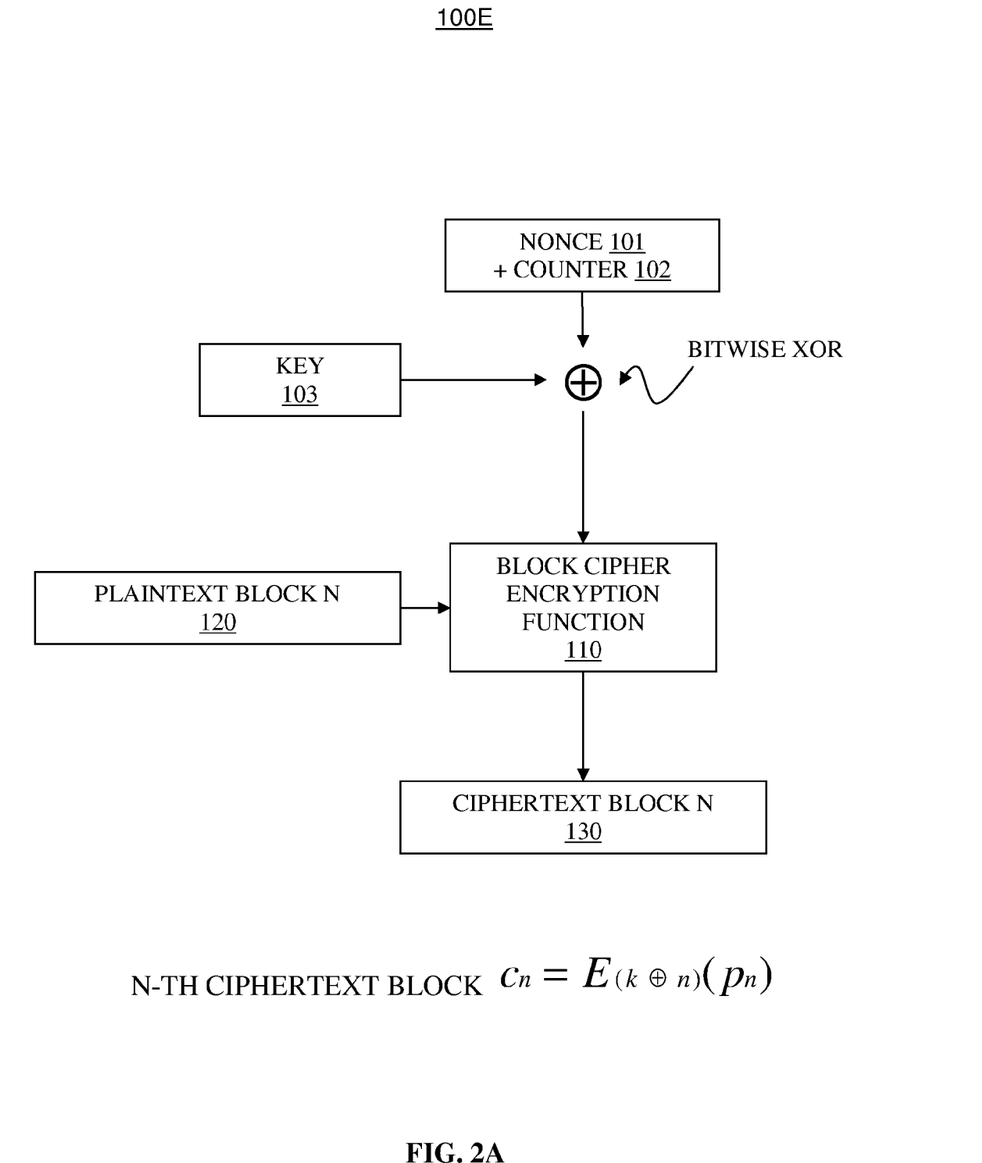
FIG. 2A illustrates a system for a key evolution method (KEM) for encrypting a plaintext block, in accordance with embodiments of the present invention.

FIG. 2A illustrates a system 100E for a key evolution method (KEM) for encrypting a plaintext block, in accordance with embodiments of the present invention.

The system 100E comprises a nonce 101, a counter 102, a key 103, a block cipher encryption function 110, a plaintext block N 120, and a ciphertext block N 130.

The nonce 101, the counter 102, and the key 103 are described in respective descriptions of FIG. 1A, supra.

A result of exclusively disjoining (XOR) a sum of the nonce 101 and the counter 102 and the key 103 is a symmetric key that is specific to each block of the plaintext. See step 330 of FIG. 3, infra.

The block cipher encryption function 110 encrypts the plaintext block N 120 with the symmetric key specific to the plaintext block N 120. The block cipher encryption function 110 outputs the ciphertext block N 130 that corresponds to the plaintext block N 120.

Figure 2B:
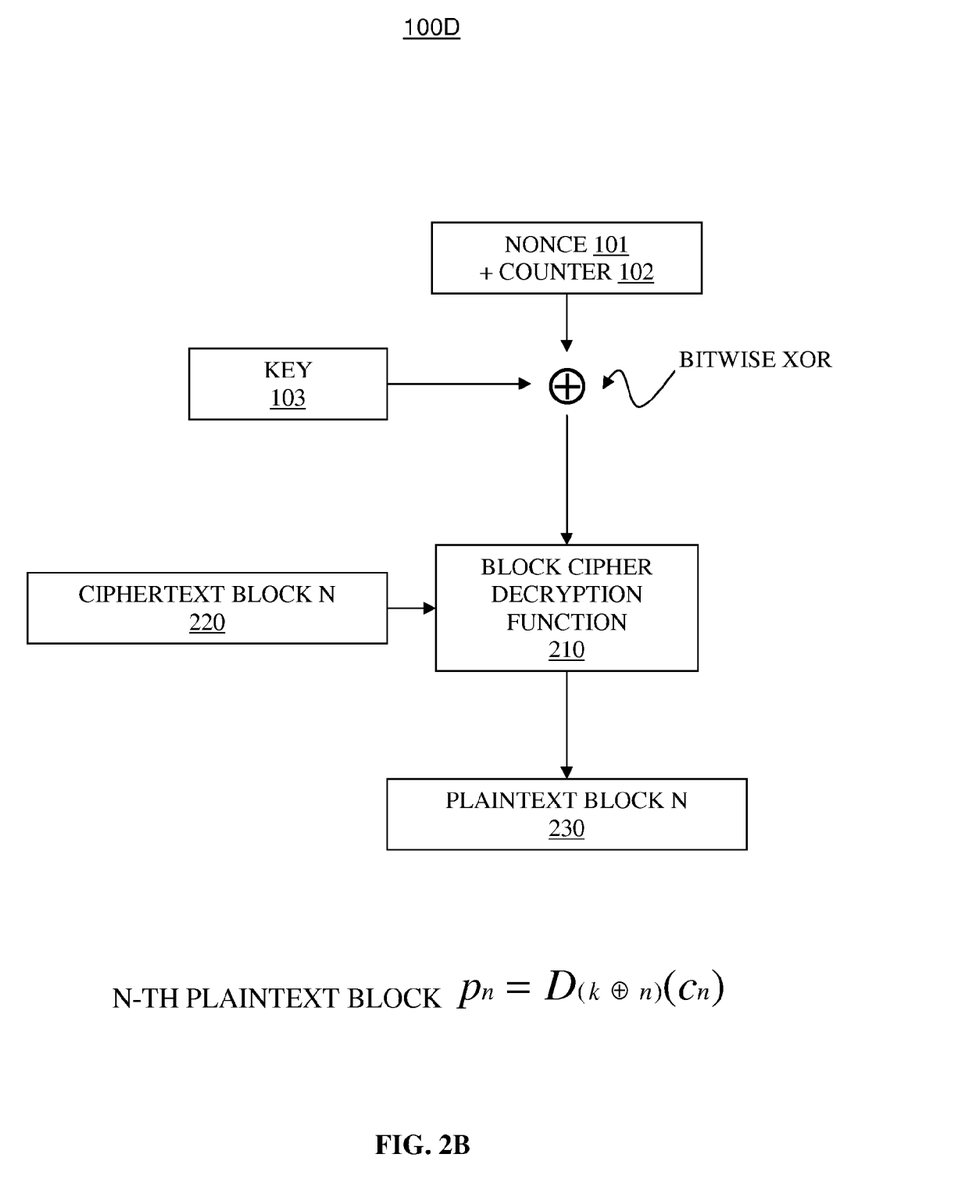
FIG. 2B illustrates a system for a key evolution method (KEM) for decrypting a ciphertext block, in accordance with embodiments of the present invention.

FIG. 2B illustrates a system 100D for a key evolution method (KEM) for decrypting a ciphertext block, in accordance with embodiments of the present invention.

The system 100D comprises a nonce 101, a counter 102, a key 103, a block cipher decryption function 210, a ciphertext block N 220, and a plaintext block N 230.

The nonce 101, the counter 102, and the key 103 are described in respective descriptions of FIG. 1A, supra.

A result of exclusively disjoining (XOR) a sum of the nonce 101 and the counter 102 and the key 103 is a symmetric key that is specific to each block of the plaintext. See step 430 of FIG. 4, infra.

The block cipher decryption function 210 decrypts the ciphertext block N 220 with the symmetric key specific to the ciphertext block N 220. The block cipher decryption function 210 outputs the plaintext block N 230 that corresponds to the ciphertext block N 220.

Figure 3:
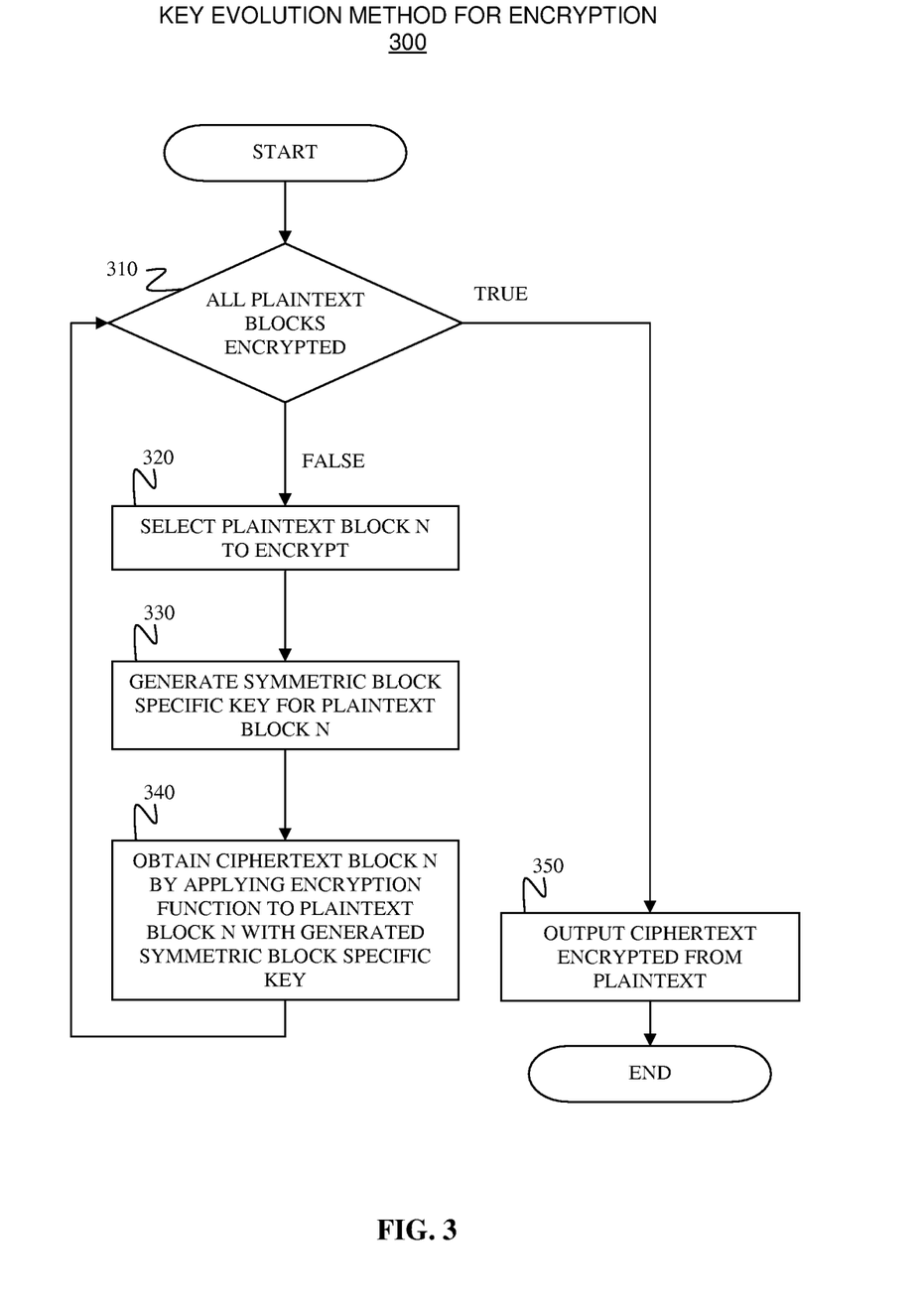
FIG. 3 is a flowchart depicting a key evolution method (KEM) process encrypting a plaintext, in accordance with the embodiments of the present invention.

FIG. 3 is a flowchart depicting a key evolution method (KEM) process encrypting a plaintext, in accordance with the embodiments of the present invention.

In step 310, the key evolution method (KEM) process determines whether all plaintext blocks are encrypted. If the KEM process determines that all plaintext blocks are encrypted, the KEM process proceeds with step 350. If the KEM process determines that at least one plaintext block is left unencrypted, the KEM process proceeds with step 320.

In step 320, the KEM process selects a plaintext block to encrypt. The KEM process may select the plaintext block in sequence or in random order, because each block of the plaintext can be independently encrypted regardless of other blocks.

In step 330, the KEM process generates a symmetric block specific key for the plaintext block selected in step 320. The KEM process takes a sum of a nonce and a counter, and a key to generate the symmetric block specific key. In the present embodiment, the key is 128-bit in size such that the probability of repeating a same value for the key is $\frac{1}{2}^{128}$=3.40282366920938463463374607431777e+38.

Because the nonce is supposedly unique for an instance of encryption/decryption and the counter is different for each plaintext block, the sum is unique for each plaintext block. In the same embodiment, the plaintext blocks are selected in sequence, and the counter is a sequence number of each plaintext block.

In other embodiments, the KEM process may use other operation instead of exclusive disjunction (XOR) to generate the symmetric block specific key such as, inter alia, a mathematical addition of the sum and the key, a one-way function such as a discrete logarithm ($k^i$ mod b), wherein k is an original key, i is an index of the plaintext block, and b is a large prime number, etc.

In step 340, the KEM process encrypts the selected plaintext block with the generated symmetric block specific key, and obtains a ciphertext block as a result. Because the symmetric block specific key is unique to the plaintext block, a key for other plaintext block cannot be used for the plaintext block. Thus, altering a single bit in either the symmetric block specific key would result in a completely different ciphertext block. Also, the ciphertext block resulting from step 340 has no correspondence in bit position with the plaintext block.

In step 350, the KEM process outputs the ciphertext that results from encrypting all plaintext blocks.

Figure 4:
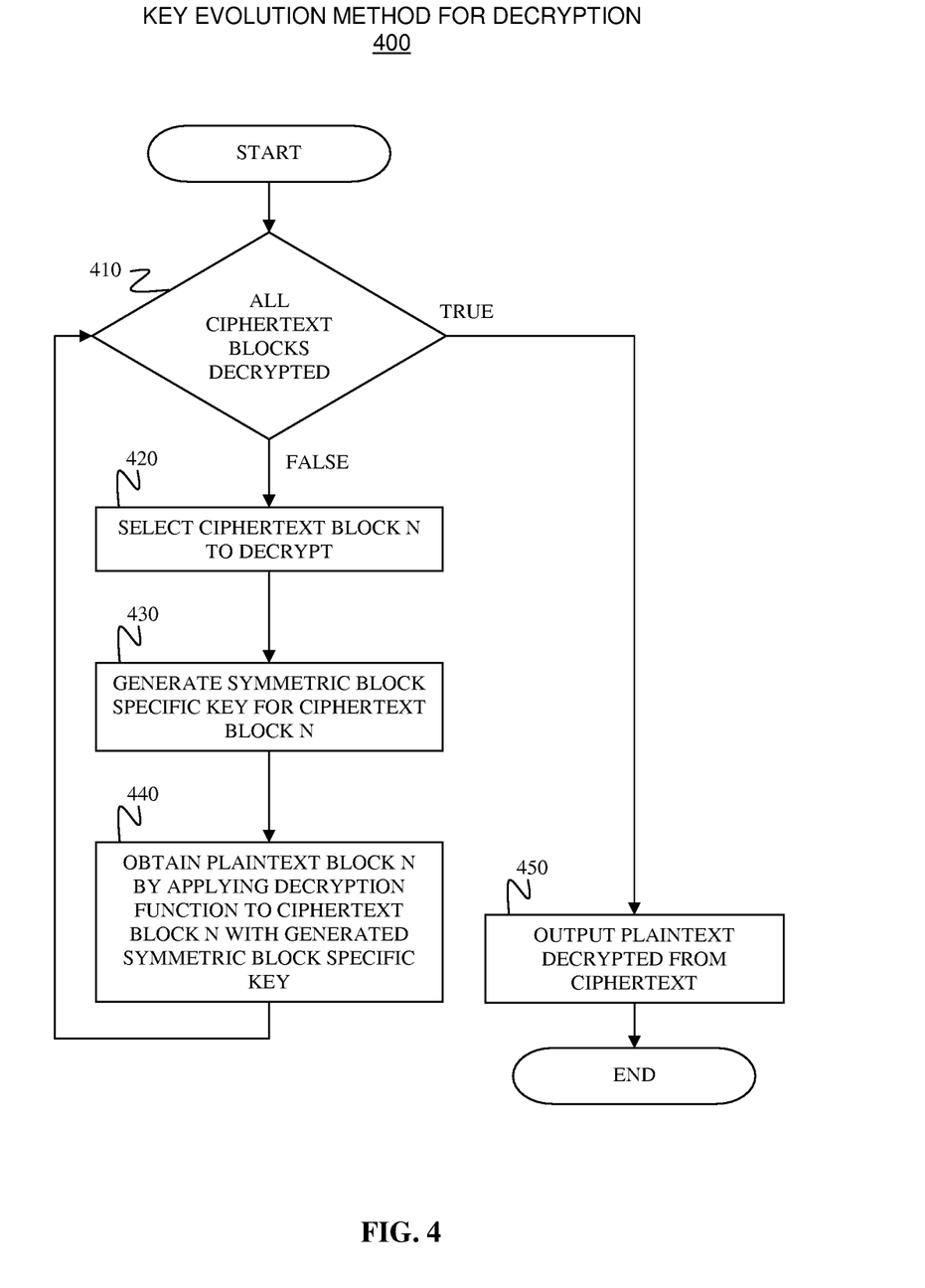
FIG. 4 is a flowchart depicting a key evolution method (KEM) process decrypting a ciphertext, in accordance with the embodiments of the present invention.

FIG. 4 is a flowchart depicting a key evolution method (KEM) process decrypting a ciphertext, in accordance with the embodiments of the present invention.

In step 410, the key evolution method (KEM) process determines whether all ciphertext blocks are decrypted. If the KEM process determines that all ciphertext blocks are decrypted, the KEM process proceeds with step 450. If the KEM process determines that at least one ciphertext block is left encrypted, the KEM process proceeds with step 420.

In step 420, the KEM process selects a ciphertext block to decrypt. The KEM process may select the ciphertext block in sequence or in random order, because each block of the ciphertext can be independently decrypted regardless of other blocks.

In step 430, the KEM process generates a symmetric block specific key for the ciphertext block selected in step 420. See description of step 330 in FIG. 3, supra.

In step 440, the KEM process decrypts the selected ciphertext block with the generated symmetric block specific key, and obtains a plaintext block as a result. Because the symmetric block specific key is unique to the ciphertext block, a key for other ciphertext block cannot be used for the plaintext block. Thus, altering a single bit in either the symmetric block specific key or the ciphertext block would result in a scrambled message after decryption. Also, the plaintext block resulting from step 440 has no correspondence in bit position with the ciphertext block.

In step 450, the KEM process outputs the plaintext that results from decrypting all ciphertext blocks.

Figure 5A:
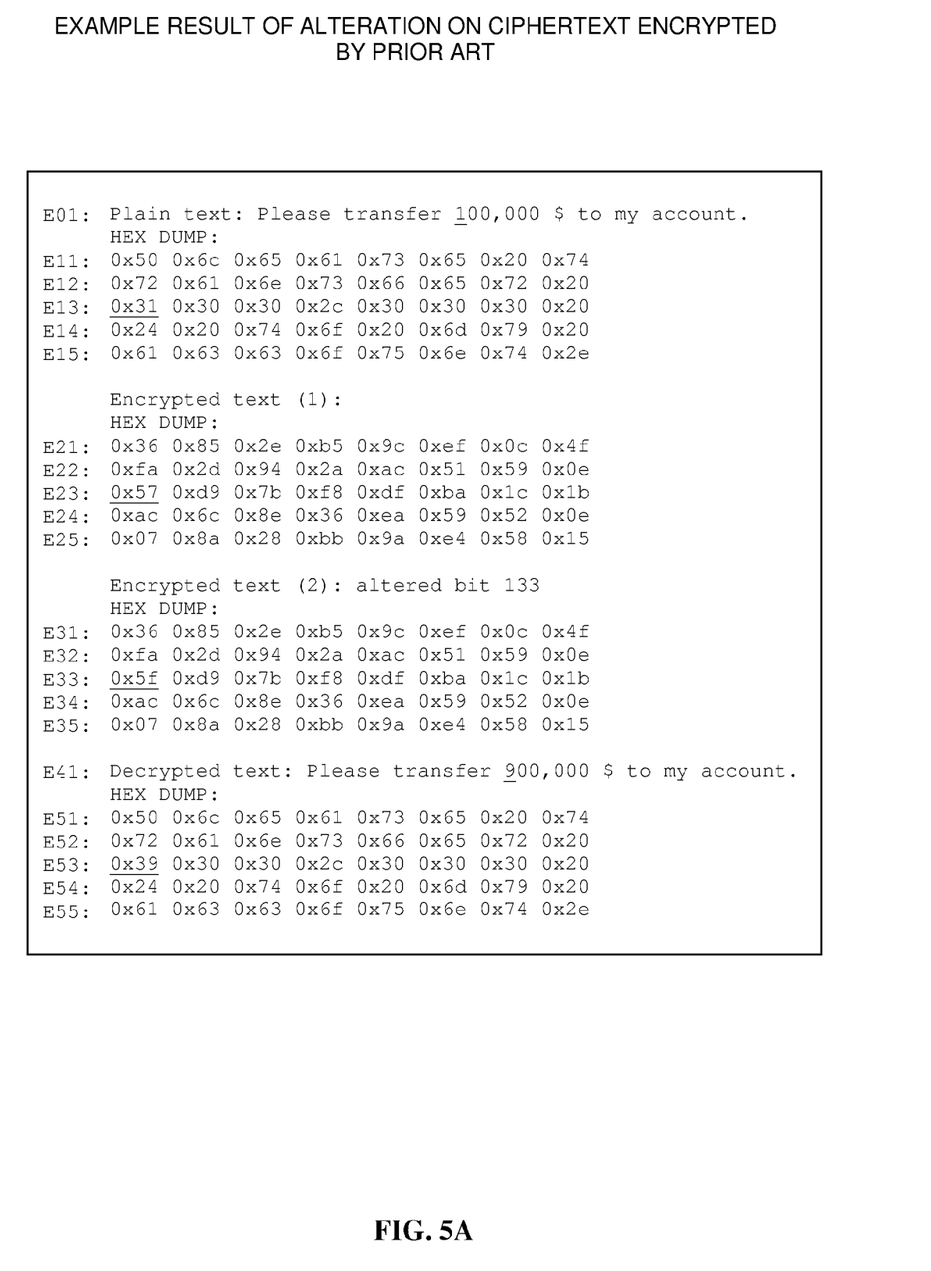
FIG. 5A illustrates a result of altering a bit in ciphertext encrypted by the prior art depicted in FIGS. 1A and 1B.

FIG. 5A illustrates a result of altering a bit in ciphertext encrypted by the prior art depicted in FIGS. 1A and 1B, supra.

Lines E11 to E15 represent, in American Standard Code for Information Interchange (ASCII) hexadecimal code, a plaintext "Please transfer 100,000 $ to my account." in line E01. The plaintext has 40 characters that are expressed in 40 bytes, one byte per character in an order presented in the plaintext. The seventeenth (17$^{th}$) byte is '1' as underlined in line E01. The seventeenth byte '1' is represented as the first byte of line E13, shown as the underlined 0x31 on the seventeenth position. A bitwise representation of the seventeenth byte 0x31 is (0011 0001).

Lines E21 to E25 represent a ciphertext resulting from encrypting the plaintext of lines E11 to E15 using the prior art encryption in FIG. 1A, supra. The prior art encrypts the plaintext bit-by-bit with a symmetric encrypted key. Consequently, the plaintext corresponds to the ciphertext bit-by-bit. The seventeenth byte 0x31 (0011 0001) in line E13 is encrypted into 0x57(0101 0111) as underlined in line E23.

Lines E31 to E35 represent an altered ciphertext that by a single bit. The fifth bit '0' of the encrypted seventeenth byte 0x57(0101 0111) is altered into '1' resulting in 0x5f(0101 1111) as underlined in line E33.

Lines E51 to E55 represent a decrypted text resulting from decrypting the altered ciphertext of lines E31 to E35 using the prior art decryption in FIG. 1B, supra. The prior art decrypts the altered ciphertext bit-by-bit with the symmetric encrypted key. Because the ciphertext corresponds to the decrypted text bit-by-bit, the altered fifth bit of the encrypted seventeenth byte 0x5f(0101 1111) is decrypted into 0x39(0011 1001) which is altered on the fifth bit of the seventeenth byte of the decrypted text. As a result, the seventeenth character of the decrypted text is altered from '1' of the plaintext to '9' as underlined in line E41. Consequently, the alteration of a message is unrecognizable by a user who decrypts the message from the altered ciphertext.

Figure 5B:
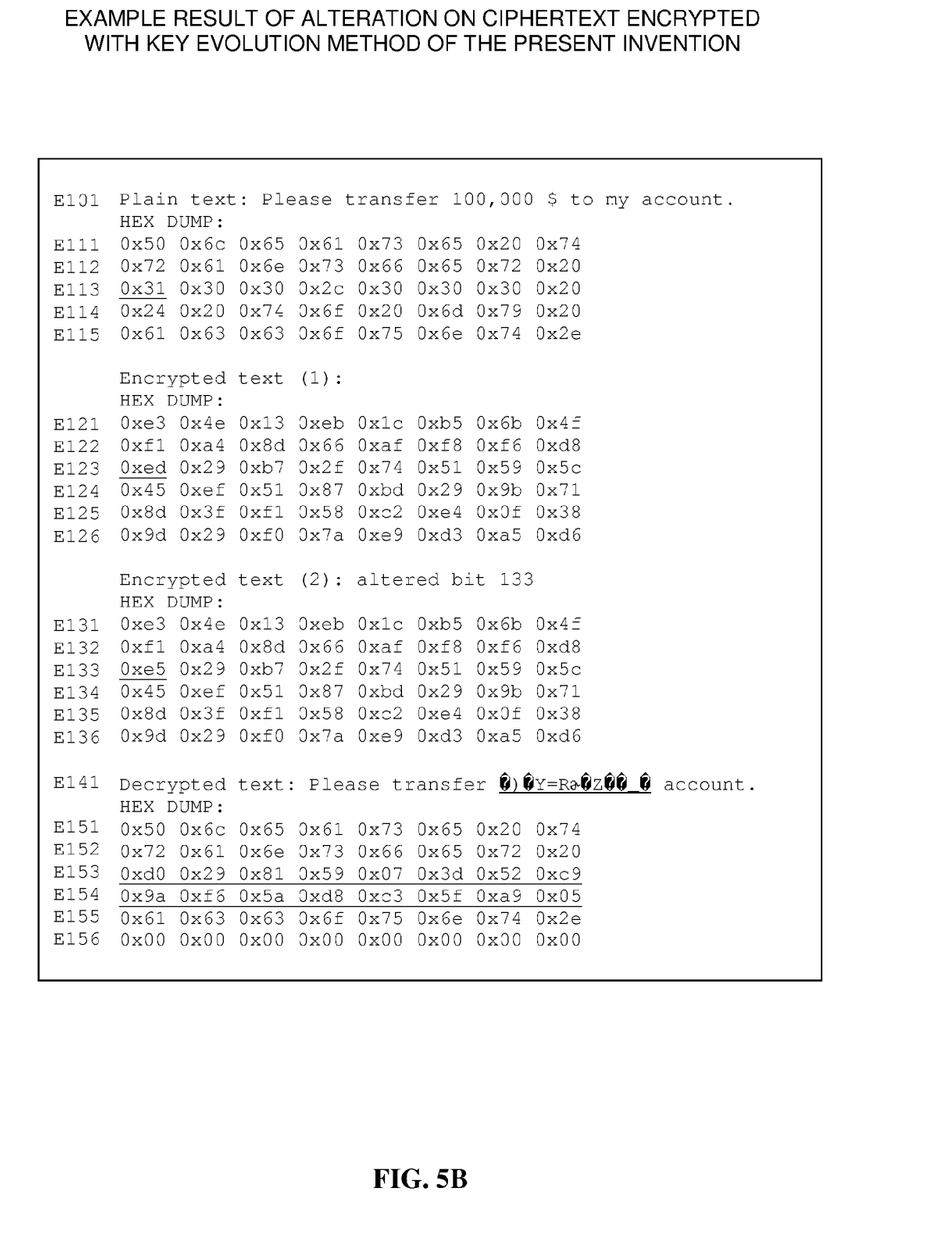
FIG. 5B illustrates a result of altering a bit in ciphertext encrypted by the key evolution method (KEM), in accordance with the embodiments of the present invention.

FIG. 5B illustrates a result of altering a bit in ciphertext encrypted by the key evolution method (KEM), in accordance with the embodiments of the present invention.

Lines E111 to E15 represent a plaintext "Please transfer 100,000 $ to my account." in line E101. As in FIG. 5A, supra, the seventeenth byte '1' is represented as the first byte of line E113, shown as the underlined 0x31(0011 0001) on the seventeenth position.

Lines E121 to E126 represent a ciphertext resulting from encrypting the plaintext of lines E111 to E115 using the key evolution method (KEM) encryption of the present invention described in FIGS. 2A and 3, supra. The KEM encrypts the plaintext by 128-bit (16-byte) block with a symmetric block specific key. As a result, the 40-byte plaintext is encrypted into a ciphertext of three blocks (48 bytes) to encompass 40 bytes of the plaintext in the smallest number of 128-bit blocks. The seventeenth byte 0xed(1110 1101) underlined in line E123 shows a target byte position of an alteration by a single bit as in FIG. 5A, supra.

Lines E131 to E136 represent an altered ciphertext on the target bit position that is the fifth bit of the seventeenth byte. 0xed(1110 1101) is altered into 0xe5(1110 0101) as underlined in line E133.

Lines E151 to E156 represent a decrypted text resulting from decrypting the altered ciphertext of lines E131 to E136 using the KEM decryption of the present invention described in FIGS. 2B and 4, supra. The KEM decrypts the altered ciphertext block-by-block with symmetric block-specific key, resulting in an unreadable second block from the seventeenth byte to the thirty-second byte as underlined in lines E153 and E154. Consequently, the alteration in the message is recognizable by a user decrypting the altered ciphertext.

Figure 6:
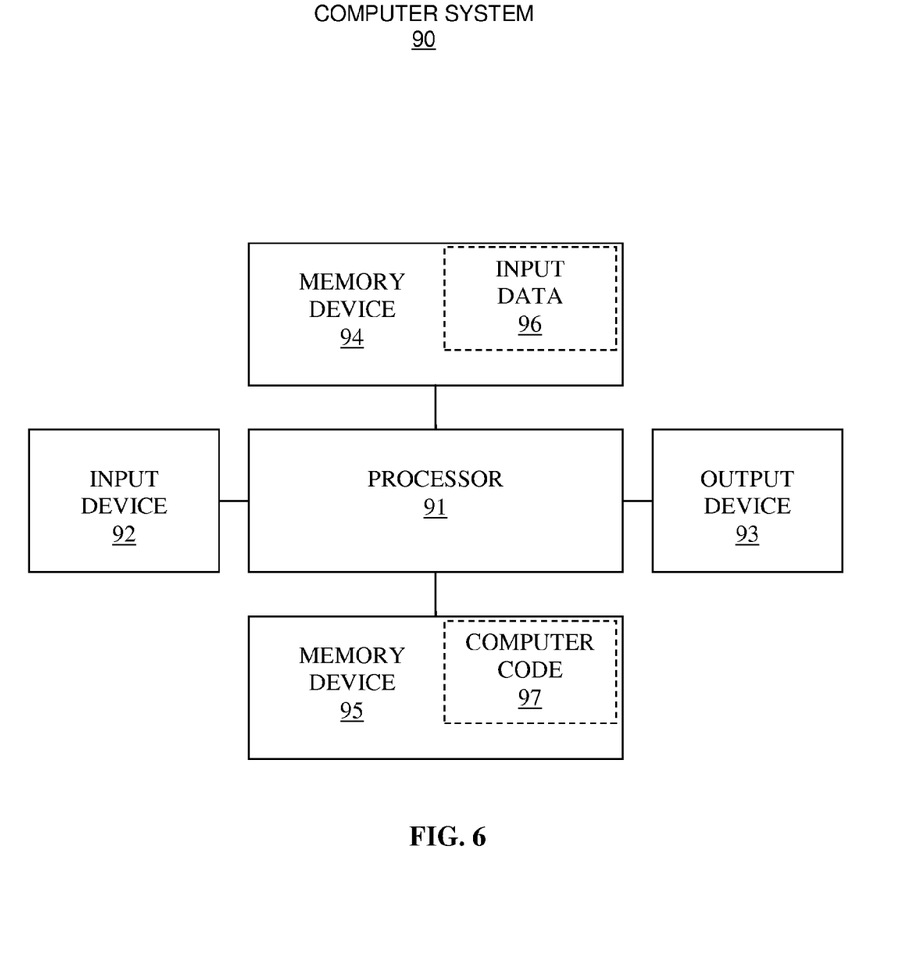
FIG. 6 illustrates a computer system used for the key evolution method, in accordance with embodiments of the present invention.

FIG. 6 illustrates a computer system 90 used for the key evolution method, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for the key evolution method according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for transforming a first text to a second text, the method comprising:

selecting, by a processor of a computer system, a block from the first text comprising at least one block, wherein the block is of a unit size for performing said transforming indicating a predefined number of bits;

generating a symmetric block specific key that is unique to the selected block by mathematically manipulating three parameters of a counter N identifying the selected block within the first text, a nonce I, and a key K used for said at least one block of the first text for both encryption and decryption, wherein the encryption is a reverse transformation of the decryption and wherein the decryption is a reverse transformation of the encryption, such that said generating calculates the symmetric block specific key that is distinctive for each block of the first text in linear time and such that the symmetric block specific key need not be stored and communicated to perform the respective reverse transformation for the selected block but independently generated by the respective reverse transformation in both the encryption and the decryption;

producing a block of the second text corresponding to the selected block by use of the selected block and the generated symmetric block specific key such that the counter N identifies both the selected block in the first text and the produced block of the second text that corresponding to the selected block; and communicating the produced block of the second text to an output device of the computer system.

2. The method of claim 1, said generating the symmetric block specific key comprising:

applying a binary operation represented by an operator o to the key K and a sum of the counter N and the nonce I, that is, K o (N+I), wherein the key K and the nonce I are shared among said at least one block of the first text and all blocks of the second text, and wherein the counter N is unique to the selected block.

3. The method of claim 2, wherein said binary operation is a bitwise exclusive disjunction (XOR).

4. The method of claim 1, said producing comprising:

determining that the selected block and the first text is plain; and generating the block of the second text corresponding to the selected block by applying a block cipher encryption function to the selected block with the generated symmetric block specific key, wherein the generated block of the second text is encrypted, and wherein the block cipher encryption function is associated with a block cipher decryption function that enables decrypting the generated block of the second text by use of the symmetric block specific key such that the second text is transformed back to the first text.

5. The method of claim 1, said producing comprising:

determining that the selected block and the first text is encrypted; and generating the block of the second text corresponding to the selected block by applying a block cipher decryption function to the selected block with the generated symmetric block specific key, wherein the generated block of the second text is decrypted, and wherein the block cipher decryption function is associated with a block cipher encryption function that enables encrypting the generated block of the second text by use of the symmetric block specific key such that the second text is transformed back to the first text.

6. The method of claim 1, wherein said selecting, said generating, and said producing are iteratively performed as a unit until a respective block of the second text for each block of said at least one block in the first text is produced.

7. The method of claim 1, wherein said producing employs the Advanced Encryption Standard (AES), wherein the key K that is common to any block of the first text and the second text is selected from a group consisting of a 128-bit key, a 192-bit key, and a 256-bit key, wherein the unit size of any block of the first text and the second text is 128 bits.

8. A computer program product, comprising a computer usable storage medium having a computer readable program code embodied therein, said computer readable program code containing instructions that when executed by a processor of a computer system implement a method for transforming a first text to a second text, the method comprising:

selecting, by a processor of a computer system, a block from the first text comprising at least one block, wherein the block is of a unit size for performing said transforming indicating a predefined number of bits;

generating a symmetric block specific key that is unique to the selected block by mathematically manipulating three parameters of a counter N identifying the selected block within the first text, a nonce I, and a key K used for said at least one block of the first text for both encryption and decryption, wherein the encryption is a reverse transformation of the decryption and wherein the decryption is a reverse transformation of the encryption, such that said generating calculates the symmetric block specific key that is distinctive for each block of the first text in linear time and such that the symmetric block specific key need not be stored and communicated to perform the respective reverse transformation for the selected block but independently generated by the respective reverse transformation in both the encryption and the decryption;

producing a block of the second text corresponding to the selected block by use of the selected block and the generated symmetric block specific key such that the counter N identifies both the selected block in the first text and the produced block of the second text that corresponding to the selected block; and communicating the produced block of the second text to an output device of the computer system.

9. The computer program product of claim 8, said generating the symmetric block specific key comprising:

applying a binary operation represented by an operator o to the key K and a sum of the counter N and the nonce I, that is, K o (N+I), wherein the key K and the nonce I are shared among said at least one block of the first text and all blocks of the second text, and wherein the counter N is unique to the selected block.

10. The computer program product of claim 9, wherein said binary operation is a bitwise exclusive disjunction (XOR).

11. The computer program product of claim 8, said producing comprising:

determining that the selected block and the first text is plain; and generating the block of the second text corresponding to the selected block by applying a block cipher encryption function to the selected block with the generated symmetric block specific key, wherein the generated block of the second text is encrypted, and wherein the block cipher encryption function is associated with a block cipher decryption function that enables decrypting the generated block of the second text by use of the symmetric block specific key such that the second text is transformed back to the first text.

12. The computer program product of claim 8, said producing comprising:

determining that the selected block and the first text is encrypted; and generating the block of the second text corresponding to the selected block by applying a block cipher decryption function to the selected block with the generated symmetric block specific key, wherein the generated block of the second text is decrypted, and wherein the block cipher decryption function is associated with a block cipher encryption function that enables encrypting the generated block of the second text by use of the symmetric block specific key such that the second text is transformed back to the first text.

13. The computer program product of claim 8, wherein said selecting, said generating, and said producing are iteratively performed as a unit until a respective block of the second text for each block of said at least one block in the first text is produced.

14. The computer program product of claim 8, wherein said producing employs the Advanced Encryption Standard (AES), wherein the key K that is common to any block of the first text and the second text is selected from a group consisting of a 128-bit key, a 192-bit key, and a 256-bit key, wherein the unit size of any block of the first text and the second text is 128 bits.

15. A computer system comprising a processor and a computer readable memory unit coupled to the processor, said memory unit containing instructions that when executed by the processor implement a method for transforming a first text to a second text, the method comprising:

selecting, by a processor of a computer system, a block from the first text comprising at least one block, wherein the block is of a unit size for performing said transforming indicating a predefined number of bits;

generating a symmetric block specific key that is unique to the selected block by mathematically manipulating three parameters of a counter N identifying the selected block within the first text, a nonce I, and a key K used for said at least one block of the first text for both encryption and decryption, wherein the encryption is a reverse transformation of the decryption and wherein the decryption is a reverse transformation of the encryption, such that said generating calculates the symmetric block specific key that is distinctive for each block of the first text in linear time and such that the symmetric block specific key need not be stored and communicated to perform the respective reverse transformation for the selected block but independently generated by the respective reverse transformation in both the encryption and the decryption;

producing a block of the second text corresponding to the selected block by use of the selected block and the generated symmetric block specific key such that the counter N identifies both the selected block in the first text and the produced block of the second text that corresponding to the selected block; and communicating the produced block of the second text to an output device of the computer system.

16. The computer system of claim 15, said generating the symmetric block specific key comprising:

applying a binary operation represented by an operator o to the key K and a sum of the counter N and the nonce I, that is, K o (N+I), wherein the key K and the nonce I are shared among said at least one block of the first text and all blocks of the second text, and wherein the counter N is unique to the selected block.

17. The computer system of claim 16, wherein said binary operation is a bitwise exclusive disjunction (XOR).

18. The computer system of claim 15, said producing comprising:

determining that the selected block and the first text is plain; and generating the block of the second text corresponding to the selected block by applying a block cipher encryption function to the selected block with the generated symmetric block specific key, wherein the generated block of the second text is encrypted, and wherein the block cipher encryption function is associated with a block cipher decryption function that enables decrypting the generated block of the second text by use of the symmetric block specific key such that the second text is transformed back to the first text.

19. The computer system of claim 15, said producing comprising:

determining that the selected block and the first text is encrypted; and generating the block of the second text corresponding to the selected block by applying a block cipher decryption function to the selected block with the generated symmetric block specific key, wherein the generated block of the second text is decrypted, and wherein the block cipher decryption function is associated with a block cipher encryption function that enables encrypting the generated block of the second text by use of the symmetric block specific key such that the second text is transformed back to the first text.

20. The computer system of claim 15, wherein said selecting, said generating, and said producing are iteratively performed as a unit until a respective block of the second text for each block of said at least one block in the first text is produced, wherein said producing employs the Advanced Encryption Standard (AES), wherein the key K that is common to any block of the first text and the second text is selected from a group consisting of a 128-bit key, a 192-bit key, and a 256-bit key, wherein the unit size of any block of the first text and the second text is 128 bits.

* * * * *